United States Patent [19]

Lamers

[11] 4,303,403

[45] Dec. 1, 1981

[54] COMPOSITE DRIVING BELT

[75] Inventor: Hendricus F. Lamers, Goirle, Netherlands

[73] Assignee: Van Doorne's Transmissie B.V., Tilburg, Netherlands

[21] Appl. No.: 113,194

[22] Filed: Jan. 18, 1980

[30] Foreign Application Priority Data

Jan. 19, 1979 [NL] Netherlands ............................ 7900435

[51] Int. Cl.$^3$ ............................ F16G 1/00; F16G 5/00
[52] U.S. Cl. .................................... 474/201; 474/242
[58] Field of Search ............... 474/201, 240, 242, 244, 474/272

[56] References Cited

U.S. PATENT DOCUMENTS

| | | | |
|---|---|---|---|
| 3,720,113 | 3/1973 | Van Doorne et al. | 474/242 |
| 3,949,621 | 4/1976 | Beusink | 474/242 |
| 4,080,841 | 3/1978 | Vollers | 474/201 |

FOREIGN PATENT DOCUMENTS

| | | | |
|---|---|---|---|
| 62996 | 7/1913 | Austria | 474/242 |
| 2414989 | 10/1975 | Fed. Rep. of Germany | 474/201 |
| 1066329 | 6/1954 | France | 474/201 |
| 256918 | 9/1948 | Switzerland | 474/201 |
| 1329 | of 1907 | United Kingdom | 474/201 |

Primary Examiner—Lawrence J. Staab
Attorney, Agent, or Firm—Cushman, Darby & Cushman

[57] ABSTRACT

A driving belt of substantially trapezium-shaped cross section for use with V-shaped pulleys, of the kind including an endless carrier and a plurality of plate-like elements disposed transverse to and slidably mounted on the carrier, each of said elements having an inner tapered end for engaging a V-shaped pulley groove, an outer end and opposite faces which abut the faces of the two adjacent elements, one of the faces at the inner end portion of each element being bevelled in a direction away from the adjacent element for enabling each element to tilt about a tilting line toward and away from said adjacent element whereby said belt can bend during use, one face of the outer end portion of each element having at least one projection which is releasably engaged in a corresponding recess in the face of the abutting element when the respective belt portion is straight, the improvement wherein said projections and recesses lie at a distance from the tilting line such that during bending of the belt and consequent tilting of said elements said projections and recesses come out of engagement.

2 Claims, 6 Drawing Figures

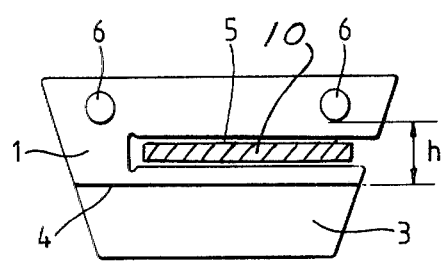
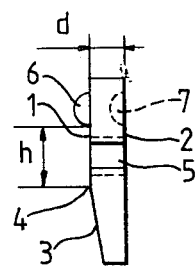
Fig. 1.  Fig. 2.
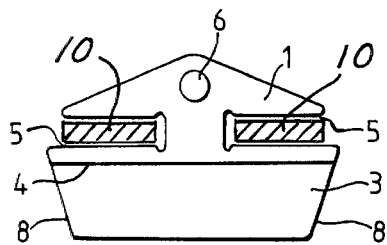
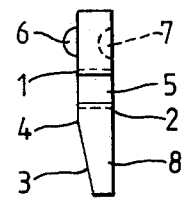
Fig. 3.  Fig. 4.
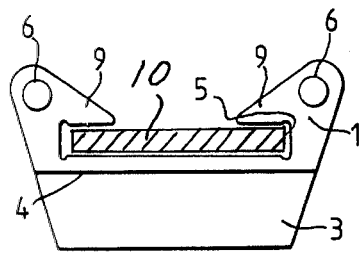
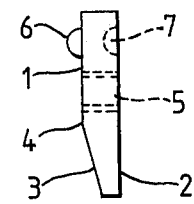
Fig. 5.  Fig. 6.

COMPOSITE DRIVING BELT

This invention relates to a composite endless driving belt of the kind constructed of a plurality of plate-like elements arranged in face-to-face abutting relationship and transversely mounted on an endless carrier, each of the elements having a cross section which tapers inwards from the endless carrier.

BACKGROUND

U.S. Pat. No. 3,949,621 discloses a driving belt of substantially trapezoid-shaped cross section for use with pulleys having V-shaped grooves, the belt being constructed of an endless carrier in the form of at least one metal band on which are slidably mounted a plurality of plate-like elements each disposed transverse to the carrier and each being in face-to-face contact with the two adjacent elements. One face at the inner end portion of each element is bevelled or tapered away from the adjacent element for enabling the bending of the driving belt whereby each transverse element contacts each adjacent element along a tilting line which is located where the bevel merges into a surface which is parallel to the opposite face. Near their outer ends the transverse elements are fitted with coupling means in the form of at least one projection on one face and a substantially corresponding recess in the other face, the projection on one element engaging the recess in an adjacent element.

In such a driving belt power substantially is transmitted by pushing forces between the transverse elements. The projections and recesses serve to center the transverse elements relative to each other. Such centering may be desirable for preventing the transverse elements in the straight parts of the driving belt from shifting relative to each other.

However, it has been established experimentally that a slight mutual shift possibility of the transverse elements is desired as long as the transverse elements are present in the pulley, since each transverse element should have the freedom to be clamped optimally between the flanges of the pulley. Also in the parts of the belt between the pulleys there should be a slight shift possibility in case of slight alignment errors of the pulleys, such as those which occur in particular with pulleys of the kind in which the mutual distance between pulleys is changed for varying the transmission ratio. The pulleys then do no lie exactly in one flat plane, so that a kind of torsion may occur in the driving belt.

U.S. Pat. Nos. 3,720,113 and 4,080,841, Swiss Pat. No. 256918 and German Offenlegungsschrift No. 2,414,989 also disclose driving belts having tiltable transverse elements.

SUMMARY OF THE INVENTION

It is the object of the invention to provide a driving belt with transverse elements provided with coupling means in the form of projections and recesses, whereby on the one end a proper mutual centering of the elements is effected, while on the other end the transverse elements are adapted to shift sufficiently in relation to each other. This is accomplished, according to the invention, by disposing the projections and recesses at a relatively large distance above the tilting line of the transverse element. This distance is such that the mutual coupling of the transverse elements remains completely operative in those parts of the driving belt that are in a straight condition, but as soon as a slight bending of the driving belt takes place, i.e. the transverse elements are tilting relative to each other, during which they remain in mutual contact through the tilting line, the projections and recesses come fully out of engagement so that the mutual centering of the transverse elements is eliminated. The belt being tensioned around the pulleys includes straight parts between the pulleys and curved parts which are in contact with the pulleys. In the straight parts the parallel surfaces of the head sides of two abutting transverse elements contact each other, so the coupling means are in engagement. In the curved parts of the belt two abutting transverse elements are tilting in respect of each other, so there is no engagement of the coupling means.

When running the belt there will not be an abrupt change from the straight parts of the belt to the parts of the belt which are in contact with the pulleys and which have a curvature corresponding to the running diameter of the respective pulley. Before coming in contact with the pulley there will already be a slight tilting of two abutting transverse elements, and also a slight tilting takes place after the transverse elements come out of contact with the pulley before reaching the straight part of the belt. In the construction of the belt according to the invention there will be a complete disengagement of the coupling means at a slight tilting of two abutting transverse elements as it occurs on both ends of the straight parts of the belt before and after the pulleys contact the transverse elements. As mentioned before such disengagement is of importance in case of alignment errors of the pulleys in which case the striaght part of the belt and the part of the belt in contact with the pulley do not lie exactly in the same flat plane.

Preferably according to the invention, the product of the distance between the tilting line and the projections and recesses and the thickness of the transverse element (i.e. the distance between the parallel portions of the abutting faces of each transverse element), both measured in mm, is larger than 3. Bending the driving belt at a given radius, the extent of mutual tilting of successive transverse elements will depend on the thickness of the transverse elements. With thinner transverse elements, the tilting will be less, so that a larger distance is required between the projections and recesses and the tilting line in order to bring the coupling means out of engagement during slight bending. Naturally, said distance also depends on the bending radius but it has been found experimentally that the influence of the running diameter of the driving belt in the pulley is of minor importance and that said general rule is adequate.

The invention furthermore relates to a transverse element as applicable in the above mentioned driving belt according to the invention and described in the claims.

BRIEF DESCRIPTION OF THE DRAWINGS

In the drawings:

FIG. 1 is a front view of a transverse belt element embodying the principles of the invention;

FIG. 2 is a side view of the element of FIG. 1;

FIGS. 3 and 4 are, respectively, a front view and a side view of a second embodiment of a transverse belt element; and FIGS. 5 and 6 are, respectively, a front view and a side view of a third embodiment of a transverse belt element.

DETAILED DESCRIPTION

The plate-like transverse element according to FIGS. 1 and 2 is of the type as described e.g. in Swiss Pat. No. 256,918 (FIGS. 6 and 7) and German Offenlegungsschrift No. 2,414,989, modified in accordance with the present invention. The transverse element has front and rear faces 1 and 2 which come into contact with the faces of successive transverse elements when assembly on a carrier 10 has taken place. Face 1, at the inner end of the element, is provided with a taper or bevel 3 which slopes away from the adjacent element. The transition between the part of the face 1 parallel to the face 2 and the bevel 3 is formed by a roll-off zone or tilting line 4. During bending of the driving belt the transverse elements are in contact with each other through the tilting line 4.

The transverse element is provided with a recess 5 for receiving the carrier 10, which for example may comprise one or more endless metal bands.

Furthermore, the transverse element includes coupling means in the form of two projections 6 on face 1 and two corresponding recesses 7 in face 2. In successive transverse elements the projections 6 mesh in the recesses 7 of the abutting transverse element, in a straight part of the driving belt, so that a mutual centering of the transverse elements is effected.

The thickness of the transverse element is indicated by d, and the distance between projection 6 or the recess 7 and the tilting line 4 is indicated by h.

According to the invention the distance h should be sufficiently large in order to eliminate the centering effect as soon as the driving belt is bent, i.e. as soon as abutting transverse elements slightly tilt relative to each other. It has been found experimentally that the magnitude of h should at least be such that $h \times d$, both expressed in mm, is larger than 3. For example, at a thickness of the transverse elements of 2 mm, distance h should consequently be larger than 1.5 mm. For thinner transverse elements the distance h is larger.

FIGS. 3 and 4 show an embodiment of a transverse element of the type as described in U.S. Pat. No. 3,949,621 (FIG. 1) and U.S. Pat. No. 4,080,841 (FIG. 3), modified according to the invention. In this embodiment the carrier comprises two endless bands 10 or band packages, which on either side are pushed into recesses 5. During use of the driving belt, the bands or band packages are prevented from laterally sliding out of the transverse elements by the V-shaped groove of the conical pulley in which the driving belt runs.

Also in this embodiment there is a substantial distance between the tilting line 4 and the projection 6 or the recess 7, such that upon slight bending of the belt and consequent tilting of the elements adjacent projections 6 and recesses 7 disengage from each other.

The transverse element shown in the embodiment according to FIGS. 5 and 6 is of the type as described in U.S. Pat. No. 3,720,113, modified according to the invention. The carrier, in the form of an endless band 10 or a band package, is pushed from above into the recess 5 of the transverse element, after which the lips 9 are bent in the position shown. As with the previous embodiments the projections 6 and recesses 7 are located a relatively great distance from the tilting line 4, such that the coupling function of the projections 6 and recesses 7 disappears upon slight bending of the belt and consequent tilting of the elements.

What is claimed is:

1. A driving belt of substantially trapezium-shaped cross section for use with V-shaped pulleys, of the kind including an endless carrier and a plurality of plate-like elements disposed transverse to and slidably mounted on the carrier, each of said elements having an inner tapered end for engaging a V-shaped pulley groove, and outer end and opposite substantially flat faces which abut the faces of the two adjacent elements, one of the faces at the inner end portion of each element having a substantially flat bevelled surface extending in a direction away from the adjacent element and forming a tilting line at the junction of the bevelled surface with said one face, the tilting line enabling each element to tilt about its respective tilting line toward and away from said adjacent element whereby said belt can bend during use, one face of the outer end portion of each element having at least one projection which is releasably engaged in a corresponding recess in the face of the abutting element when the respective belt portion is straight, the improvement wherein said projections and recesses lie at a distance from the tilting line in a direction toward the outer ends of said elements such that during bending of the belt and consequent tilting of said elements said projections and recesses come out of engagement.

2. A driving belt according to claim 1 wherein the product of the distance between the tilting line and the projections and recesses and the thickness of each transverse element between its faces, both measured in mm, is larger than 3.

* * * * *